(12) United States Patent
Moulik et al.

(10) Patent No.: US 8,800,975 B2
(45) Date of Patent: Aug. 12, 2014

(54) GAS SPRING AND GAS DAMPER ASSEMBLY AND METHOD

(75) Inventors: Pradipta N. Moulik, Carmel, IN (US); Joseph A. Bounds, Fishers, IN (US); Graham R. Brookes, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 13/003,244

(22) PCT Filed: Jul. 9, 2009

(86) PCT No.: PCT/US2009/050102
§ 371 (c)(1),
(2), (4) Date: Jan. 7, 2011

(87) PCT Pub. No.: WO2010/006167
PCT Pub. Date: Jan. 14, 2010

(65) Prior Publication Data
US 2011/0115140 A1    May 19, 2011

Related U.S. Application Data

(60) Provisional application No. 61/165,781, filed on Apr. 1, 2009, provisional application No. 61/140,495, filed on Dec. 23, 2008, provisional application No. 61/120,719, filed on Dec. 8, 2008, provisional application No. 61/079,276, filed on Jul. 9, 2008.

(51) Int. Cl.
*F16F 9/05* (2006.01)
(52) U.S. Cl.
CPC ........................................ *F16F 9/05* (2013.01)
USPC ................... 267/64.24; 267/64.25; 267/64.26

(58) Field of Classification Search
CPC .................................. F16F 9/05; F16F 9/055
USPC .......... 267/64.23–64.27, 64.21, 64.19, 64.13, 267/122
See application file for complete search history.

(56) References Cited

U.S. PATENT DOCUMENTS

| 2,773,686 A | 12/1956 | Nash |
| 3,046,003 A | 7/1962 | Schultz |
| 3,168,278 A | 2/1965 | Ogden |

(Continued)

FOREIGN PATENT DOCUMENTS

| DE | 24 06 835 | 8/1975 |
| DE | 3824932 C1 | 1/1990 |

(Continued)

OTHER PUBLICATIONS

"High Purity Porous Metal Flow Restrictors," Mott Corporation catalog, Farmington, Connecticut, USA.

*Primary Examiner* — Anna Momper
(74) *Attorney, Agent, or Firm* — Jason A. Houser; Fay Sharpe LLP

(57) ABSTRACT

A gas spring and gas damper assembly includes a first end member, a second end member and a flexible wall that at least partially defines a first spring chamber therebetween. A damping chamber wall at least partially defines a damping chamber. A damper piston is received within the damping chamber and is operatively connected between the first and second end members and within the first spring chamber. A suspension system that includes a gas spring and gas damper assembly as well as a method of assembly are also included.

20 Claims, 7 Drawing Sheets

(56) References Cited

U.S. PATENT DOCUMENTS

| | | | |
|---|---|---|---|
| 3,374,981 A | 3/1968 | Stuckenberger et al. | |
| 3,730,473 A | 5/1973 | Pepi | |
| 3,889,936 A | 6/1975 | Shimizu | |
| 3,915,421 A | 10/1975 | Le Forestier | |
| 3,989,232 A | 11/1976 | Steinbach et al. | |
| 4,325,541 A * | 4/1982 | Korosladanyi et al. | 267/220 |
| 4,493,481 A | 1/1985 | Merkle | |
| 4,518,154 A | 5/1985 | Merkle | |
| 4,629,170 A | 12/1986 | Warmuth, II | |
| 4,635,909 A | 1/1987 | Gold | |
| 4,647,025 A | 3/1987 | Gold | |
| 4,669,710 A | 6/1987 | Horvat | |
| 4,697,797 A | 10/1987 | Gold | |
| 4,742,996 A | 5/1988 | Gold | |
| 4,743,000 A | 5/1988 | Karnopp | |
| 4,854,555 A * | 8/1989 | Ohkawa et al. | 267/64.24 |
| 4,934,667 A | 6/1990 | Pees et al. | |
| 5,042,784 A | 8/1991 | Murai et al. | |
| 5,067,684 A | 11/1991 | Garnjost | |
| 5,071,108 A | 12/1991 | Houghton, Jr. | |
| 5,169,129 A | 12/1992 | Hoffman | |
| 5,234,203 A | 8/1993 | Smith | |
| 5,285,995 A | 2/1994 | Gonzalez et al. | |
| 5,316,273 A | 5/1994 | Vaphiadis | |
| 5,366,048 A * | 11/1994 | Watanabe et al. | 188/267.1 |
| 5,379,980 A | 1/1995 | Houghton, Jr. et al. | |
| 5,382,006 A | 1/1995 | Arnold | |
| 5,449,150 A * | 9/1995 | Watanabe et al. | 267/64.24 |
| 5,489,009 A * | 2/1996 | Kawamata et al. | 188/267.1 |
| 5,628,496 A | 5/1997 | Chamberlin | |
| 5,669,597 A | 9/1997 | Rittstieg et al. | |
| 5,797,593 A | 8/1998 | Oyaizu | |
| 5,918,862 A | 7/1999 | Nelson | |
| 5,954,316 A | 9/1999 | Voss | |
| 5,996,980 A | 12/1999 | Frey et al. | |
| 6,089,552 A | 7/2000 | Pahl | |
| 6,402,128 B1 | 6/2002 | Trowbridge | |
| 6,508,460 B2 | 1/2003 | Job | |
| 6,547,224 B2 | 4/2003 | Jensen et al. | |
| 6,547,225 B1 | 4/2003 | Nelson | |
| 6,561,500 B2 | 5/2003 | Schisler et al. | |
| 6,651,995 B1 * | 11/2003 | Buttner | 280/124.157 |
| 6,691,989 B1 | 2/2004 | Leonard | |
| 6,782,979 B1 | 8/2004 | Gold et al. | |
| 6,926,263 B1 | 8/2005 | Nelson | |
| 7,150,451 B2 | 12/2006 | Soles et al. | |
| 7,213,799 B2 * | 5/2007 | Behmenburg et al. | 267/64.24 |
| 7,487,957 B2 | 2/2009 | Brunneke et al. | |
| 7,644,943 B2 | 1/2010 | Hayes et al. | |
| 7,802,776 B2 | 9/2010 | Behmenburg et al. | |
| 7,832,747 B2 | 11/2010 | Siebeneick | |
| 7,866,681 B1 | 1/2011 | Shahly | |
| 7,886,882 B2 | 2/2011 | Behmenburg et al. | |
| 8,002,250 B2 | 8/2011 | Hujer et al. | |
| 8,025,272 B2 | 9/2011 | Schallmeier | |
| 8,215,620 B2 | 7/2012 | Krauss | |
| 2004/0119250 A1 | 6/2004 | Rehra et al. | |
| 2004/0124571 A1 | 7/2004 | Gold et al. | |
| 2004/0130079 A1 | 7/2004 | Gold et al. | |
| 2004/0201146 A1 | 10/2004 | Behmenburg et al. | |
| 2006/0207846 A1 | 9/2006 | Krauss | |
| 2007/0246316 A1 * | 10/2007 | Brunneke et al. | 188/266.6 |
| 2008/0290571 A1 | 11/2008 | Krauss | |
| 2009/0200718 A1 | 8/2009 | Roemer et al. | |
| 2010/0096786 A1 | 4/2010 | Orlamünder et al. | |
| 2011/0115139 A1 | 5/2011 | Moulik et al. | |
| 2011/0115140 A1 | 5/2011 | Moulik et al. | |

FOREIGN PATENT DOCUMENTS

| | | | |
|---|---|---|---|
| DE | 3934821 A1 * | 4/1991 | |
| DE | 44 01 770 A1 | 8/1995 | |
| DE | 100 27 369 B4 | 7/2004 | |
| DE | 10 2005 045 251 A1 | 3/2007 | |
| DE | 102006052627 A1 * | 5/2008 | |
| EP | 1 464 865 B1 | 10/2005 | |
| EP | 1 457 362 B1 | 10/2006 | |
| EP | 1 715 213 A1 | 10/2006 | |
| EP | 1 895 185 A2 | 3/2008 | |
| EP | 1 947 360 A1 | 7/2008 | |
| EP | 1 464 866 B1 | 7/2009 | |
| EP | 1 715 215 B1 | 10/2009 | |
| GB | 2117866 A * | 10/1983 | |
| WO | WO 01/01012 A1 | 1/2001 | |
| WO | WO 02/22385 A1 | 3/2002 | |
| WO | WO 2009/124742 A1 | 10/2009 | |
| WO | WO 2009/124743 A1 | 10/2009 | |

* cited by examiner

GAS SPRING AND GAS DAMPER ASSEMBLY AND METHOD

This application claims the benefit of priority from U.S. Provisional Patent Application No. 61/165,781 filed on Apr. 1, 2009; U.S. Provisional Patent Application No. 61/140,495 filed on Dec. 23, 2008; U.S. Provisional Patent Application No. 61/120,719 filed on Dec. 8, 2008; and U.S. Provisional Patent Application No. 61/079,276 filed on Jul. 9, 2008, the subject matter of each of which is hereby incorporated herein by reference in its entirety.

BACKGROUND

The present disclosure broadly relates to the art of spring devices and, more particularly, to a gas spring and gas damper assembly that includes a gas spring used in combination with a gas damper, as well as a vehicle suspension system and a method of operating such a gas spring and gas damper assembly.

Suspension systems, such as may be used in connection with motorized vehicles, for example, typically include one or more spring elements for accommodating forces and loads associated with the operation and use of the corresponding system or device (e.g., a motorized vehicle). In such applications it is often considered desirable to select spring elements that have the lowest suitable spring rate, as this can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., softer, more-compliant springs) will transmit a lesser amount of the inputs to the sprung mass. In many cases, this will be considered a desirable affect on the sprung mass, such as by providing a more comfortable ride, for example.

Such suspension systems also commonly include one or more dampers or damping elements that are operative to dissipate undesired inputs and movements of the sprung mass, such as road inputs occurring under dynamic operation of a vehicle, for example. Typically, such dampers are liquid filled and operatively connected between a sprung and unsprung mass, such as between a body and axle of a vehicle, for example. In other arrangements, however, the damping element can be of a type and kind that utilizes gaseous fluid rather than liquid as the working medium. In such known constructions, the gas damper portion permits gas flow between two or more volumes of pressurized gas, such as through one or more orifices, as shown, for example, in U.S. Patent Application Publication No. 2004/0124571, or through one or more valve ports, as shown, for example, in U.S. Patent Application Publication No. 2003/0173723. Generally, there is some resistance to the movement of pressurized gas through these passages or ports, and this resistance acts to dissipate energy associated with the gas spring portion and thereby provide some measure of damping.

One difficulty with known gas spring and gas damper assemblies involves balancing spring rate with damping performance. It is generally understood that increased damping performance can be achieved through the use of increased differential pressure between the gas chambers of the gas damper. In some cases, this can be achieved by operating a gas damper at an increased internal gas pressure. However, this increased gas pressure can, in some cases, have an undesirable affect on the spring rate of the gas spring, such as by undesirably increasing the spring rate in applications in which a lower spring rate is desired, for example.

Accordingly, it is desired to develop a gas spring and gas damper assembly as well as a suspension system and method using the same that overcome the foregoing and other difficulties associated with known constructions.

BRIEF DESCRIPTION

One example of a gas spring and gas damper assembly in accordance with the subject matter of the present disclosure can include a first end member and a second end member that is disposed in longitudinally-spaced relation to the first end member. A flexible wall is operatively connected between the first and second end members such that a spring chamber is at least partially defined therebetween. A damping chamber wall is on the first end member and is at least partially disposed within the spring chamber. The damping chamber wall at least partially defines a damping chamber. A damper piston is disposed within the damping chamber such that a first portion of the damping chamber is formed along one side of the damper piston and a second portion of the damping chamber is formed along an opposing side of the damper piston. The damper piston is operatively connected to the second end member and is capable of reciprocal movement within the damping chamber in an approximately longitudinal direction. The first portion of the damping chamber is disposed in fluid communication with the spring chamber such that gas can be transferred between the first portion and the spring chamber during reciprocal movement of the damper piston to thereby dissipate kinetic energy acting on the gas spring and gas damper assembly. The second portion of the damping chamber is disposed in fluid communication with one of the first portion of the damping chamber and an associated gas atmosphere external to the gas spring and gas damper assembly.

Another example of a gas spring and gas damper assembly in accordance with the subject matter of the present disclosure can include a first end member and a second end member that is disposed in longitudinally-spaced relation to the first end member. The second end member includes an inner side wall and an outer side wall. The inner side wall at least partially defines an inner cavity. The assembly also includes a gas damper piston that has opposing piston surfaces and is at least partially received within the inner cavity such that first and second portions of the inner cavity are at least partially defined by said opposing piston surfaces. The gas damper piston slidably engages the inner side wall and is adapted for longitudinal displacement therealong. The assembly further includes a gas damper connector rod that operatively connects the first end member and the gas damper piston such that relative longitudinal displacement between the first and second end members results in displacement of the gas damper piston along the inner side wall within the inner cavity. The assembly also includes flexible sleeve that is operatively connected between the first and second end members at least partially defining a spring chamber therebetween. The first portion of the inner cavity is in fluid communication with the spring chamber by way of at least one passage extending through the second end member.

A gas spring and gas damper assembly according to the preceding paragraph can be provided wherein a substantially fluid-tight seal is formed between the gas damper piston and the inner side wall of the second end member, and the second portion of the inner cavity is open to the external atmosphere.

A gas spring and gas damper assembly according to any one of the two preceding paragraphs can be provided wherein a substantially fluid-tight seal is formed between the gas damper piston and the inner side wall of the second end member, and the first and second portions of the inner cavity are in fluid communication with one another.

A further example of a gas spring and gas damper assembly in accordance with the subject matter of the present disclosure can include a first end member and a second end member that is disposed in longitudinally-spaced relation to the first end member. The second end member includes an end wall and a side wall that at least partially define an inner cavity of the second end member. The end wall includes first and second passages extending therethrough. A third end member is at least partially disposed within the inner cavity of the second end member and is rigidly interconnected with the first end member through the first passage of the second member. A first flexible wall is operatively connected between the first and second end members such that a spring chamber is at least partially defined therebetween. A second flexible wall is operatively connected between the second and third end members such that the inner cavity of the second end member is separated into first and second chambers that are substantially fluidically isolated from one another. The first chamber of the inner cavity is in fluid communication with the spring chamber by way of the second passage through the second end member. The second chamber of the inner cavity is in fluid communication with an external atmosphere.

Still another example of a gas spring and gas damper assembly in accordance with the subject matter of the present disclosure can include a first end member having an end member wall and an opening extending through the end member wall. A second end member is disposed in longitudinally-spaced relation to the first end member, and a flexible wall is operatively connected to the first and second end members such that a substantially fluid-tight seal is formed between the flexible wall and each of the first and second end members to thereby at least partially define the spring chamber therebetween. A gas damper assembly is operatively connected to at least one of the first and second end members and is at least partially disposed within the spring chamber. The gas damper assembly includes a damper housing, a damper piston and a damper rod. The damper housing is supported on one of the first and second end members and includes a housing wall that at least partially defines a damping chamber. The housing wall includes first and second fluid passages extending therethrough. The damper piston includes a first piston side, a second piston side disposed in longitudinally-spaced relation to the first piston side and an outer peripheral wall that extends longitudinally between the first and second piston sides. The damper piston is received within the damper chamber of the damper housing such that the damping chamber is separated into a first chamber portion disposed along the first piston side and a second chamber portion disposed along the second piston side. The first and second chamber portions are substantially fluidically isolated from one another by the damper piston. The damper piston is adapted for reciprocal movement within the damping chamber in a longitudinal direction along at least a portion of the housing wall. The damper rod extends longitudinally between opposing first and second ends. The first end of the damper rod is operatively connected to the damper piston, and the second end of the damper rod projects outwardly from the damper housing and is operatively connected to the other of the first and second end members. The first fluid passage is disposed in fluid communication between the first chamber portion of the damping chamber and an associated gas atmosphere external to the gas spring and gas damper assembly such that gas can be transferred into and out of the first chamber portion of the damping chamber through the first fluid passage during reciprocal movement of the damper piston. The second fluid passage is disposed in fluid communication between the second chamber portion of the damping chamber and the spring chamber such that gas can be transferred between the second chamber portion and the spring chamber during reciprocal movement of the damper piston to thereby dissipate kinetic energy acting on the gas spring and gas damper assembly.

One example of a vehicle suspension system in accordance with the subject matter of the present disclosure can include a gas spring and gas damper assembly according to any one of the foregoing paragraphs and a pressurized gas system. The pressurized gas system includes a pressurized gas source in fluid communication with the spring chamber of the gas spring and gas damper assembly.

One example of a method of operating a gas spring and gas damper assembly in accordance with the subject matter of the present disclosure can include providing a first end member and a second end member with the second end member including a damping chamber wall that at least partially defines a damping chamber. The method can also include providing a damper piston received within the damping chamber such that the damping chamber has first and second portions on opposing sides of the damper piston, and forming a gas damper by operatively connecting the damper piston to the first end member such that relative displacement of the first and second end members results in displacement of the damper piston within the damping chamber. The method can further include forming a spring chamber about the gas damper from a first flexible wall secured between the first and second end members. The method can also include transferring pressurized gas between the spring chamber and the first portion of the damping chamber to dissipate kinetic energy acting on the gas spring and gas damper assembly.

Another example of a method of operating a gas spring and gas damper assembly in accordance with the subject matter of the present disclosure can include providing a first end member and a second end member with the first end member including a side wall at least partially defining an end member cavity. The method also includes forming a gas damper from a damper piston received within the end member cavity such that the end member cavity has first and second on opposing sides of the damper piston by operatively connecting the damper piston to the second end member such that relative displacement of the first and second end members results in displacement of the damper piston within the end member cavity along the side wall. The method further includes forming a spring chamber about the damper from a first flexible wall secured along the first and second end members. The method also includes transferring pressurized gas between the spring chamber and the first portion of the end member cavity to dissipate kinetic energy acting on the gas spring and gas damper assembly.

A further example of a method of operating a gas spring and gas damper assembly in accordance with the subject matter of the present disclosure can include providing a first end member, a second end member, and a third end member. The second end member including an end wall and a side wall that at least partially defines an inner cavity of the second end member. The end wall includes at least a first passage and a second passage that extends therethrough. The third end member is at least partially received within the inner cavity of the second end member. The method also includes securing a first flexible wall between the first end member and the second end member to at least partially define a spring chamber in fluid communication with the inner cavity of the second end member through the first passage. The method further includes securing a second flexible wall between the second end member and the third end member to separate the inner cavity into a first chamber in fluid communication with the spring chamber through the first passage and a second chamber in fluid communication with an external atmosphere. The method also includes interconnecting the first end member and the third end member such that: (1) upon movement of the first and second end members away from one another, a volume of the spring chamber increases and a volume of the first chamber decreases; and (2) upon movement of the first and second end members toward one another, the volume of the spring chamber decreases and the volume of the first chamber increases. The method further includes transferring pressurized gas between the spring chamber and the first chamber during the movements in (1) and (2) and thereby dissipating kinetic energy acting on the gas spring and gas damper assembly.

Still another example of a method of operating a gas spring and gas damper assembly in accordance with the subject matter of the present disclosure can include providing a first end member, a second end member and flexible wall. The method also includes providing a gas damper assembly that includes a damper housing, a damper piston and a damper rod. The damper housing includes a housing wall at least partially defining a damping chamber. The housing wall includes first and second fluid passages that extend therethrough. The damper piston is received within the damper chamber such that the damping chamber is separated into first and second chamber portions that are fluidically isolated from one another with the first fluid passage in communication with the first chamber portion and the second fluid passage is in fluid communication with the second chamber portion. The damper rod includes a end operatively connected to the damper piston and a second end projecting outwardly from the damper housing. The method further includes interconnecting the damper housing to one of the first and second end members and interconnecting the second end of the damper rod to the other of the first and second end members such that the gas damper assembly is at least partially disposed therebetween. The method also includes securing the flexible wall between the first and second end members to at least partially define a spring chamber therebetween with the gas damper assembly disposed at least partially within the spring chamber. The method further includes fluidically interconnecting the first fluid passage with a gas atmosphere external to the gas spring and fluidically interconnecting the second fluid passage with the spring chamber such that: 1) upon movement of the first and second end members toward one another, the second chamber portion increasing in volume such that gas within the spring chamber flows into the second chamber portion through the second fluid passage to thereby dissipate kinetic energy acting on the gas spring and gas damper assembly; 2) upon movement of the first and second end members away from one another, the second chamber portion decreasing in volume such that gas within the second chamber portion flows into the spring chamber through the second fluid passage to thereby dissipate kinetic energy acting on the gas spring and gas damper assembly. The method also includes transferring gas between the gas atmosphere external to the gas spring and the first chamber portion through the first fluid passage during movement of the first and second end members toward and away from one another as described in 1) and 2).

DETAILED DESCRIPTION

Figure 1:
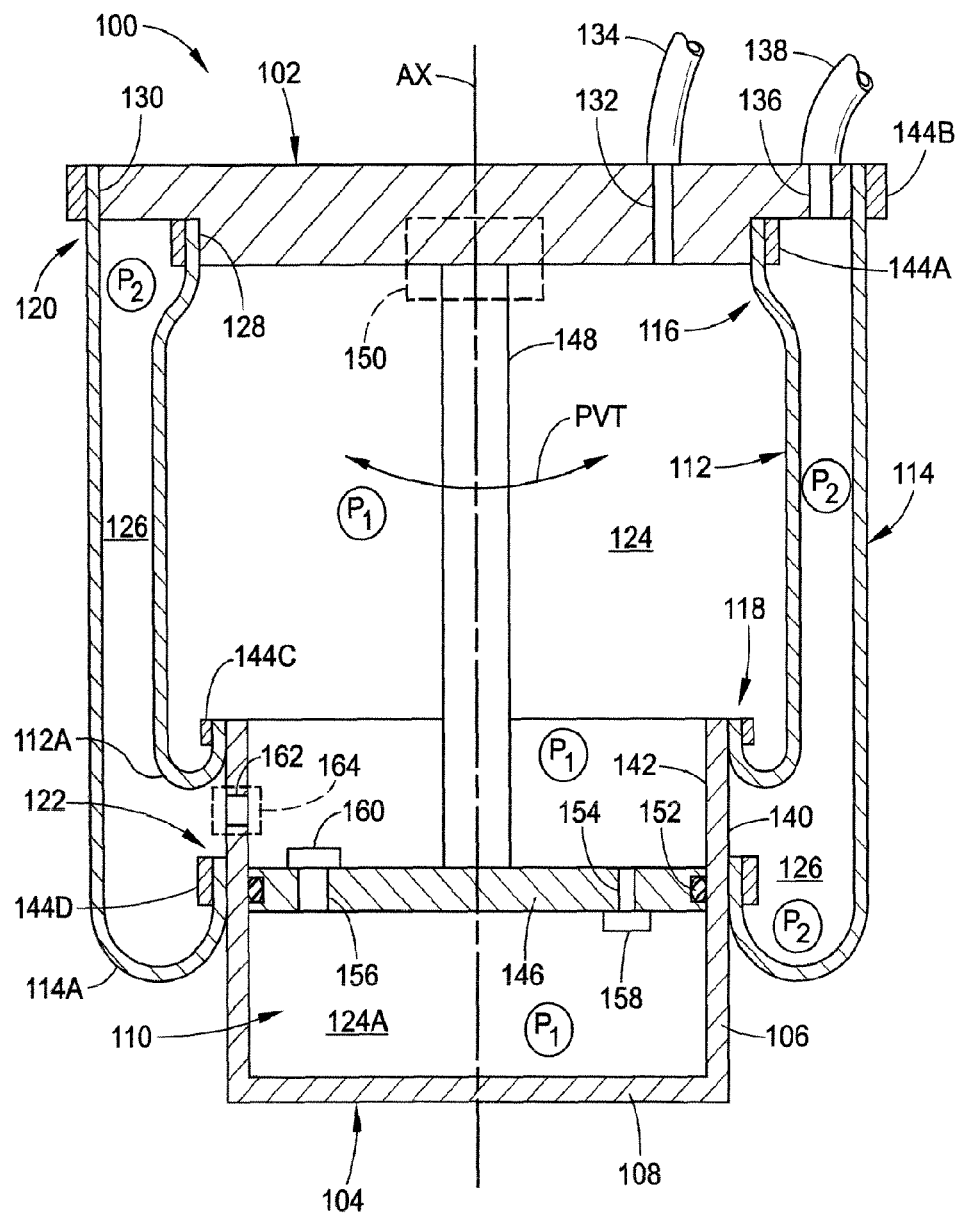
FIG. 1 is a schematic representation of one example of a gas spring and gas damper assembly in accordance with the subject matter of the present disclosure.

Turning now to the drawings, wherein the showings are for the purpose of illustrating exemplary embodiments of the subject matter of the present disclosure only and not for the purposes of limiting the same, FIG. 1 illustrates a gas spring and gas damper assembly 100 that includes a first or upper end member 102 and a second or lower end member 104 disposed in longitudinally-spaced relation to the first end member. Assembly 100 also includes a longitudinally-extending axis AX that extends generally between first and second end members 102 and 104. Second end member 104 includes a side wall 106 and an end wall 108 that at least partially define an end member cavity 110 within second end member 104.

Assembly 100 also includes a first or inner flexible wall 112 and a second or outer flexible wall 114, respectively. Inner flexible wall 112 is disposed circumferentially about axis AX and extends longitudinally between a first or upper end 116 and a second or lower end 118. Similarly, outer flexible wall 114 is disposed circumferentially about axis AX and extends longitudinally between a first or upper end 120 and a second or lower end 122. First end 116 of inner flexible wall 112 is operatively connected along first end member 102 and second end 118 of the inner flexible wall is secured along second end member 104 such that a first or inner spring chamber 124 is at least partially defined between the first and second end members by inner flexible wall 112. Additionally, first end 120 of outer flexible wall 114 is secured along first end member 102 and second end 122 of the outer flexible wall is secured along second end member 104 such that a second or outer spring chamber 126 is at least partially defined between the first and second end members by outer flexible wall 114.

It will be appreciated that first end member 102 and second end member 104 can be of any suitable type, kind, configuration, arrangement and/or construction. In the exemplary embodiment shown in FIG. 1, first end member 102 is of a single or unitary construction and includes at least one side wall along which an end of a flexible wall is secured. Such an end member may be referred to in the art as a top plate or cap. First end member 102 differs from conventional top plates in that first end member 102 includes a first or inner side wall 128 and a second or outer side wall 130 that is spaced radially-outwardly from the inner side wall. First end member 102 is also shown as including a first passage 132 that extends through the first end member and is suitable for fluidically interconnecting inner spring chamber 124 with an external atmosphere (e.g., such as by way of a vent or exhaust) or pressurized gas system (e.g., an air compressor, a compressed air reservoir, a valve assembly or other device), such as by way of a gas transfer line 134 that is operatively connected to the first end member, for example. First end member 102 can also optionally include a second passage 136 that extends through the first end member and is suitable for fluidically interconnecting outer spring chamber 126 with an external atmosphere or pressurized gas system or device, such as by way of a gas transfer line 138, for example. Additionally, it will be appreciated that any other suitable fittings, connectors and/or flow control devices (e.g., valves) can optionally be included.

Second end member 104, which is sometimes referred to in the art as a piston, is shown in FIG. 1 as including side wall 106 that extends longitudinally toward first end member 102 from along end wall 108. An outer surface 140 of side wall 106 is shown in FIG. 1 as being substantially cylindrical. However, it will be appreciated that the outer surface or outer profile of the second end member can be of any suitable size, shape and/or configuration, such as cylindrical, frustoconical, curvilinear or any combination thereof, for example. Side wall 106 also includes an inner surface 142 that at least partially defines end member cavity 110. In one preferred arrangement, inner surface 142 will be substantially cylindrical along the longitudinal length thereof.

Furthermore, inner flexible wall 112 and outer flexible wall 114 can be of any suitable kind, type, configuration, arrangement and/or construction. In the exemplary arrangement shown, the inner and outer flexible walls are both elongated flexible sleeves or bellows of a suitable construction. However, one or more convoluted bellow-type flexible walls could alternately, or additionally, be used. One example of a suitable construction for inner and/or outer walls 112 and/or 114 can include one or more layers of elastomeric material (e.g., rubber or thermoplastic elastomer) and can optionally include one or more fabric plies (e.g., plies of cotton, nylon or aramid fibers) or any other reinforcing elements, materials and/or components.

Also, it will be appreciated that the inner and outer flexible walls can be secured on or along the first and second end members in any suitable manner. For example, first ends 116 and 120 of inner and outer flexible walls 112 and 114, respectively, are received along inner and outer side walls 128 and 130, respectively, of first end member 102 and secured thereto using retaining rings 144A and 144B. However, it will be appreciated that any other suitable arrangement could alternately be used. As one example of an alternate construction, two bead plates could be used with the first bead plate being an inner bead plate crimped along a bead wire embedded within the first end of the inner flexible wall. The second bead plate could then be crimped along a bead wire embedded within the first end of the outer flexible wall. The first and second bead plates could then be secured to one another in any suitable manner.

Additionally, second ends 118 and 122 of inner and outer flexible walls 112 and 114, respectively, can be secured along second end member 104 in any suitable manner. For example, second ends 118 and 122 are shown in FIG. 1 as being disposed along outer surface 140 of side wall 106 and secured thereto using retaining rings 144C and 144D, respectively. While outer surface 140 of side wall 106 is shown in FIG. 1 as being substantially cylindrical, it will be appreciated that, in practice, one or more features (e.g., steps, notches, grooves, shoulders) may be provided for maintaining the ends of the flexible walls in the desired position along the side wall. Regardless of the manner in which the second ends of the inner and outer flexible walls are secured along second end member 104, inner and outer flexible walls 112 and 114 are each shown as forming a rolling lobe, which are indicated respectively by reference numbers 112A and 114A, that rolls or is otherwise displaced along outer surface 140 of side wall 106 as the first and second end members are longitudinally displaced relative to one another.

Gas spring and gas damper assembly 100 is also shown in FIG. 1 as including a damper piston 146 that is received within end member cavity 110 for longitudinal displacement along inner surface 142 of side wall 106. As such, inner spring chamber 124, which is otherwise fluidically interconnected with end member cavity 110, is separated into a main inner spring chamber, which is identified by reference number 124, along one side of damper piston 146 and a secondary inner spring chamber 124A formed within end member cavity 110 along the opposing side of damper piston 146 from the main inner spring chamber. A damper rod 148 operatively connects damper piston 146 to first end member 102 such that displacement of first and second end members 102 and 104 relative to one another will generate or otherwise result in movement of damper piston 146 within end member cavity 110. Such movement of damper piston 146 can operate to dissipate kinetic energy acting on assembly 100 and, thus, damp vibrations and other inputs, as is understood by those of skill in the art.

It will be appreciated that the interconnection between damper rod 148 and first end member 102 can be made in any suitable manner and by way of any suitable connection and/or arrangement. For example, damper rod 148 is shown in FIG. 1 as being rigidly connected to first end member 102, such as might be accomplished by a flowed-metal joint (e.g., a weld) or a threaded fastener connection, for example. As another example, a connection suitable for permitting pivotal movement or other angular displacement, represented by arrow PVT in FIG. 1, of the damping rod relative to the first end member can optionally be used. Such a connection is schematically represented in FIG. 1 by dashed box 150. Examples of connections that would permit pivotal movement could include ball and socket joints, spherical bearings and/or universal joints. It will be appreciated, however, that such a connection can be of any suitable type, kind, arrangement, configuration and/or construction.

In the present exemplary arrangement, assembly 100 acts to damp kinetic energy by allowing gas to flow between main inner spring chamber 124 and secondary inner spring chamber 124A as damper piston 146 is displaced along inner surface 142 of side wall 106. It will be appreciated that such a flow of gas can be provided for in any suitable manner, such as by providing a gap between the outer peripheral edge of the damper piston and the inner surface of the side wall and allowing gas to flow through the gap as the damper piston is displaced. An alternative arrangement is shown in FIG. 1 in which damper piston 146 includes a suitable sealing member 152 for forming a substantially fluid-tight seal between the damper piston and the inner surface of the side wall. Damper piston 146 also includes one or more passages formed therethrough that permit gas to flow between the main and secondary inner spring chambers as the damper piston is displaced. In the exemplary arrangement shown, damper piston 146 includes a first passage 154 and an optional second passage 156.

In some cases it is desirable for the damper piston to provide different damping performance and/or output in one direction of movement than is provided in the opposite direction of movement. As such, first passage 154 can include a first property or characteristic (e.g., size, shape, configuration, direction of gas flow) operatively associated with a first direction of travel. Additionally, optional second passage 156, if provided, can include a second property or characteristic (e.g., size, shape, configuration, direction of gas flow) that may be different from that of first passage 154 such that different damping performance can be provided in each direction of travel of damper piston 146. As one example, such different properties and/or performance characteristics of passages 154 and 156 could be provided by optional valves 158 and 160 that are schematically represented in FIG. 1 as being provided along the first and second passages, respectively.

As discussed above, it will be appreciated that, in the broadest sense, gas spring and gas damper assemblies are known and have been proposed for use in a variety of applications and/or operating environments. Additionally, it is generally understood that increased damping performance can be achieved from a gas damper by operating the same at an increased internal gas pressure. That is, damping performance increases as the gas pressure within the damper is increased. It has also been recognized, however, that known gas spring and gas damper assemblies may suffer undesirable effects due to extended operation thereof at elevated gas pressures, which would otherwise provide improved damping performance. As such, known gas spring and gas damper assemblies generally operate at lower nominal operating pressures, which undesirably results in lower damping performance. However, a gas spring and gas damper assembly in accordance with the subject matter of the present disclosure, such as assembly 100, for example, differs from known constructions in that substantially higher gas pressures can be used within the subject gas spring and gas damper assembly, which results in substantially improved damping performance.

Figure 2:
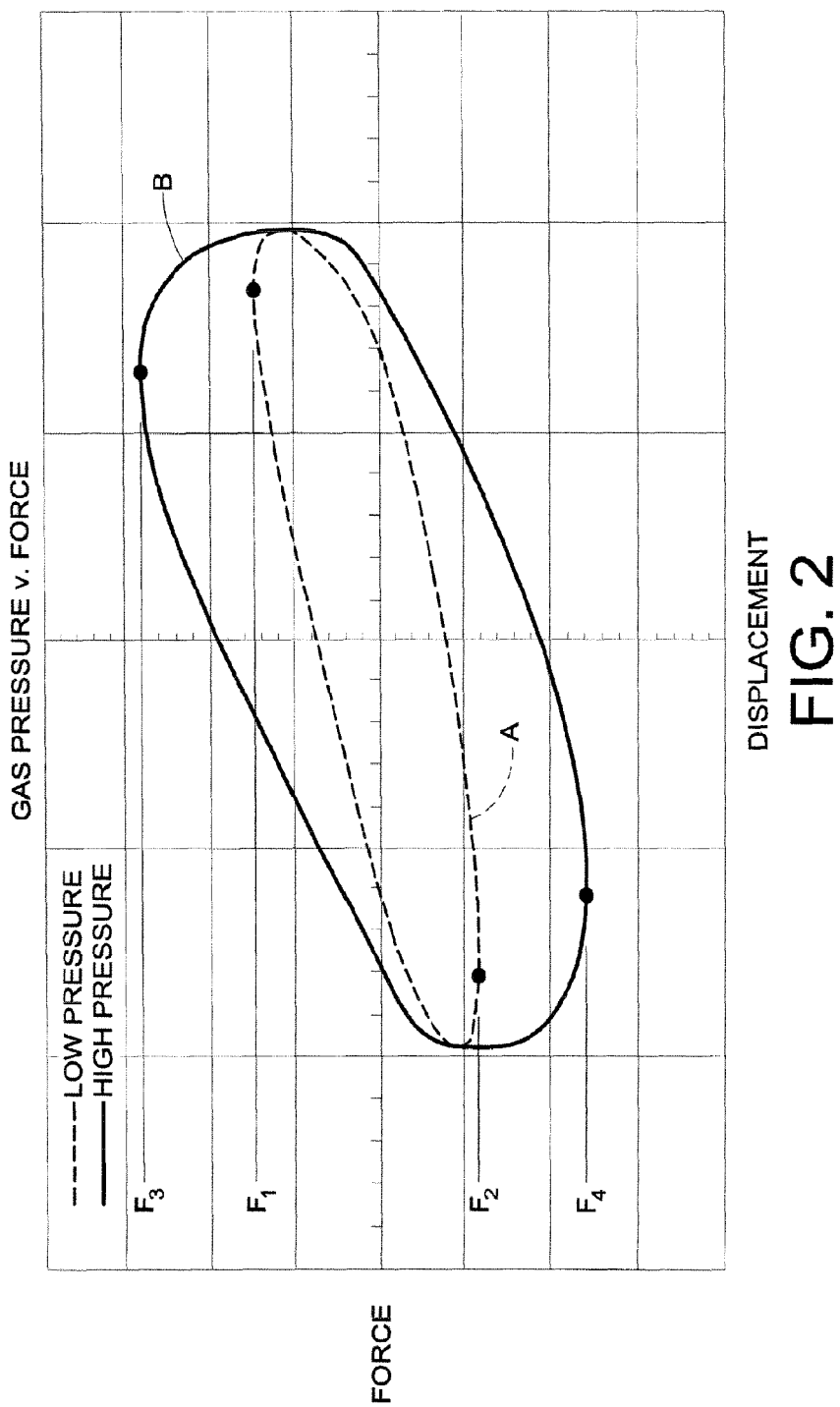
FIG. 2 is a graphical representation of gas pressure versus force.

FIG. 2 graphically represents the damping performance generated by a conventional gas spring and gas damper and the anticipated performance of a gas spring and gas damper assembly in accordance with the subject matter of the present disclosure. More specifically, FIG. 2 illustrates variations in force as a gas spring and gas damper assembly is displaced and the gas damper piston thereof undergoes displacement within a damping chamber. In the present exemplary arrangement, inner spring chambers 124 and 124A operate as such a damping chamber of gas spring and gas damper assembly 100.

Plot A of FIG. 2 represents the expected performance of a conventional gas spring and gas damper assembly and includes peak force values, which are represented in FIG. 2 by reference characters $F_1$ and $F_2$. Plot B of FIG. 2 represents the expected performance of a gas spring and gas damper assembly in accordance with the subject matter of the present disclosure, such as assembly 100, for example. Plot B includes peak force values, which are represented in FIG. 2 by reference characters $F_3$ and $F_4$, that are substantially increased over corresponding peak values $F_1$ and $F_2$ of Plot A. As one exemplary estimate, it is expected that an increase in force within a range of from about 100 percent to about 200 percent can be obtained through the use of a gas spring and gas damper assembly in accordance with the subject matter of the present disclosure in comparison with a similarly sized gas spring and gas damper assembly of a known construction.

Generally, a gas spring and gas damper assembly of a known construction will operate at relatively-low nominal operating pressures, such as at nominal pressures within a range of from about 60 psi to about 120 psi, for example. Thus, the damping performance of such known gas spring and gas damper assemblies is limited by this relatively-low nominal operating pressure. A gas spring and gas damper assembly in accordance with the subject matter of the present disclosure, however, is expected to include a damping chamber that will operate at substantially-higher nominal operating pressures, such as at nominal pressures within a range of from about 200 psi to about 350 psi, for example. Thus, the aforementioned increase in damping performance is expected to result for the subject gas spring and gas damper construction.

In an installed condition and during use, a gas spring and gas damper assembly in accordance with the subject matter of the present disclosure, such as assembly 100, for example, will include one spring chamber operating at a first nominal gas pressure and a second spring chamber operating at a second nominal spring chamber that is lower than the first nominal spring chamber. For example, inner spring chambers 124 and 124A of gas spring and gas damper assembly 100 can operate at a first nominal gas pressure $P_1$, such as a nominal gas pressure within a range of from approximately 200 psi to approximately 350 psi, for example. Outer spring chamber 126 can operate at a second nominal gas pressure $P_2$, such as a nominal gas pressure within a range of from approximately 60 psi to approximately 175 psi, for example.

It will be appreciated that operation of a conventional flexible wall of a gas spring assembly at nominal pressures of greater than about 175 psi may result in decreased performance of the gas spring assembly and, as such, that operation of conventional gas spring assemblies at such pressure levels is generally avoided. It will be recognized, however, that outer spring chamber 126 of the subject gas spring and gas damper assembly surrounds and substantially encapsulates inner flexible wall 112. As such, inner flexible wall 112 is only subjected to the differential pressure (i.e., according to a relationship in which $DP=P_1-P_2$) between nominal operating pressure $P_1$ of inner spring chambers 124 and 124A and nominal operating pressure $P_2$ of outer spring chamber 126. By selectively inflating the inner and outer spring chambers to maintain the differential pressure within a predetermined range, any decrease in performance of inner flexible wall 112 due to the increased pressure in the inner spring chambers can be minimized while providing increased damping performance due to the substantially increased pressure within the damping chamber (i.e., within inner spring chambers 124 and 124A).

The selective inflation and maintenance of the desired differential pressure can be provided in any suitable manner. As one example, inner spring chambers 124 and 124A can be selectively filled and/or vented by way of passage 132 and outer spring chamber 126 can be selectively filled and/or vented by way of passage 136. Such selective transfer of pressurized gas can be cooperatively performed by a suitable pressurized gas system and/or control device. As another example, a passage can be provided between the inner and outer spring chambers that is operative permit fluid flow therethrough and thereby alter the gas pressure in one chamber as the gas pressure in the other chamber varies. In the exemplary arrangement shown, a passage 162 extends through side wall 106 of second end member 104. Additionally, a flow control device, such as a valve, for example, can optionally be provided for selectively controlling gas flow through passage 162. A schematic representation of such a valve is illustrated in FIG. 1 and is identified by item number 164. Such a flow control device, if provided, can be of any suitable type and/or kind, such as a pressure release valve and/or a proportional flow valve, for example.

Figure 3:
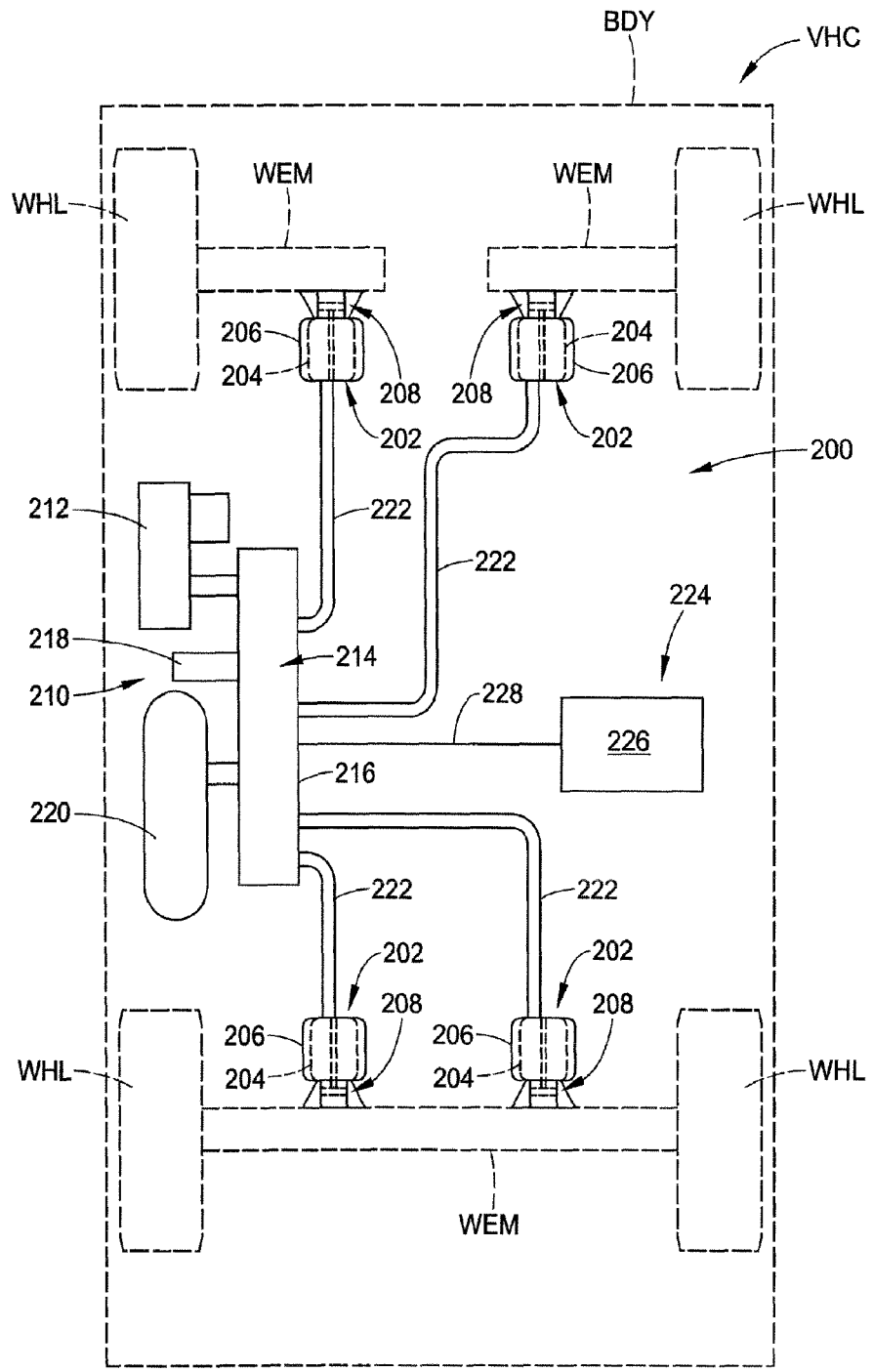
FIG. 3 is a schematic representation of one example of a suspension system utilizing a gas spring and gas damper assembly in accordance with the subject matter of the present disclosure.

It will also be appreciated that a gas spring and gas damper assembly in accordance with the subject matter of the present disclosure, such as assembly 100, or example, can be adapted for use in any application and/or operating environment in which a spring device and damping device are operated in parallel with one another. One example of such an application and use is in association with vehicle seat suspensions, such as may be used in heavy-duty vehicle cabs, tractor-trailer cabs and farm equipment cabs, for example. Another example of a suitable application and use is in operative association with a vehicle suspension system. One exemplary arrangement of a vehicle suspension system that includes a plurality of gas spring and gas damper assemblies in accordance with the subject matter of the present disclosure is shown in FIG. 3 and identified by item number 200. Suspension system 200 is shown as being disposed between a sprung mass, such as an associated vehicle body BDY, for example, and an unsprung mass, such as an associated wheel WHL or an associated wheel-engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner.

Suspension system 200 is shown as including a plurality of gas spring and gas damper assemblies that are supported between the sprung and unsprung masses of the associated vehicle. In the embodiment shown in FIG. 1, suspension system 200 includes four gas spring and gas damper assemblies 202, one of which is disposed toward each corner of the associated vehicle adjacent a corresponding wheel WHL. However, it will be appreciated that any other suitable number of gas spring and gas damper assemblies could alternately be used in any other suitable configuration or arrangement.

As shown in FIG. 3, gas spring and gas damper assemblies 202 are supported between wheel-engaging members WEM and body BDY of associated vehicle VHC. As discussed in detail hereinbefore, gas spring and gas damper assemblies 202 include first and second flexible walls 204 and 206 as well as a gas damper portion 208. As discussed above, it will be recognized that the gas spring and gas damper assemblies shown and described herein (e.g., gas spring and gas damper assemblies 100 and 202) are of a rolling lobe-type construction. However, it will be appreciated that the present novel concept can be utilized in association with gas spring and gas damper assembly arrangements and/or construction of any other suitable type and/or construction.

Suspension system 200 also includes a pressurized gas supply system 210 that is operatively associated with the gas spring and gas damper assemblies for selectively supplying pressurized gas (e.g., air) thereto and selectively transferring pressurized gas therefrom. In the exemplary embodiment shown in FIG. 3, gas supply system 210 includes a pressurized gas source, such as a compressor 212, for example, for generating pressurized air or other gases. The gas supply system can also include any number of one or more control devices of any suitable type, kind and/or construction as may be capable of effecting the selective transfer of pressurized gas. For example, a valve assembly 214 is shown as being in communication with compressor 212 and can be of any suitable configuration or arrangement. In the exemplary embodiment shown, valve assembly 214 includes a valve block 216 with a plurality of valves (not shown) supported thereon. Valve assembly 214 can also optionally include a suitable exhaust, such as a muffler 218, for example, for venting pressurized gas from the system. Optionally, pressurized gas supply system 210 can also include a reservoir 220 in fluid communication with valve assembly 214 and suitable for storing pressurized gas.

The one or more control devices, such as valve assembly 214, for example, can be in communication with gas spring and gas damper assemblies 202 in any suitable manner, such as, for example, through suitable gas transmission lines 222. As such, pressurized gas can be selectively transmitted to and/or from the gas spring and gas damper assemblies through valve assembly 214, such as to alter or maintain vehicle height at one or more corners of the vehicle, for example.

Suspension system 200 also includes a control system 224 that is capable of communication with any one or more other systems and/or components (not shown) of suspension system 200 and/or of which VHC for selective operation and control of the suspension system. Control system 224 includes a controller or electronic control unit (ECU) 226 in communication with compressor 212 and/or valve assembly 214, such as through a conductor or lead 228, for example, for selective operation and control thereof, including supplying and exhausting pressurized fluid to and from gas spring and gas damper assemblies 202. Controller 226 can be of any suitable type, kind and/or configuration.

Control system 224 can also optionally include one or more height or distance sensing devices (not shown) as well as any other desired systems and/or components (e.g., pressure sensors and accelerometers). Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Figure 4:
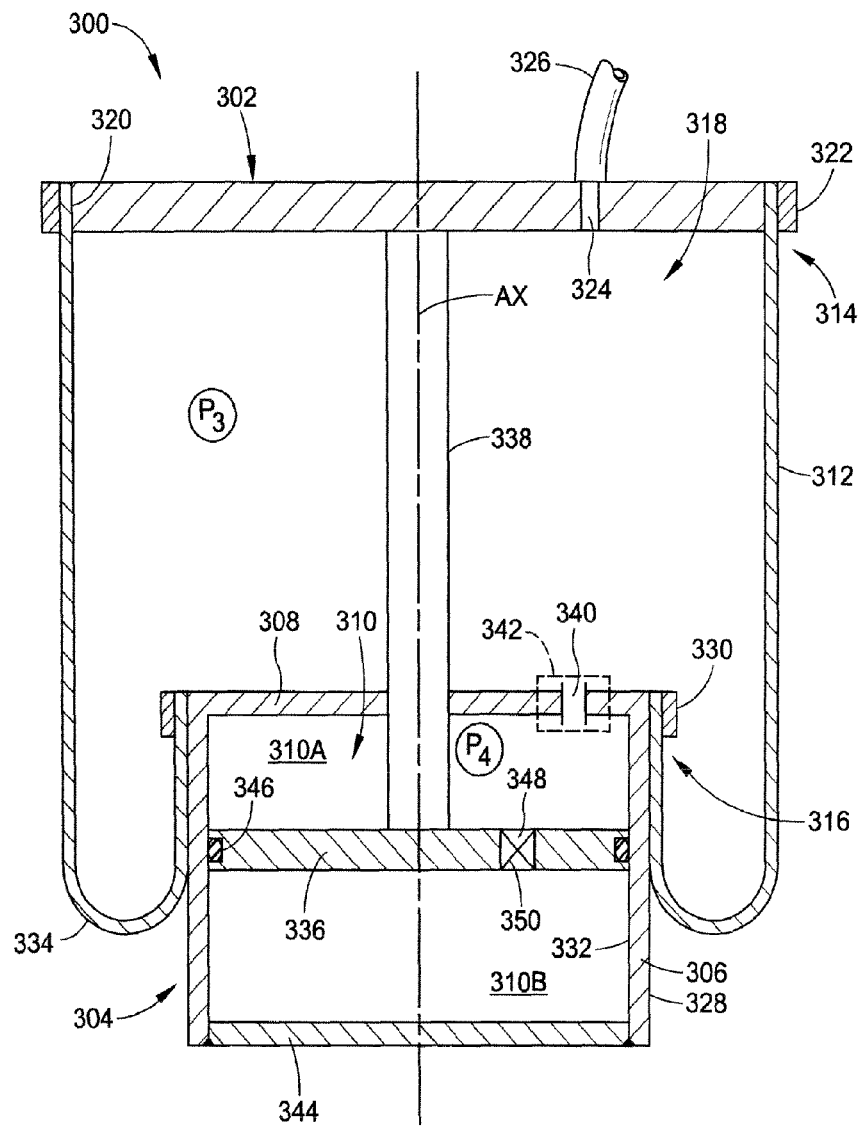
FIG. 4 is a schematic representation of another example of a gas spring and gas damper assembly in accordance with the subject matter of the present disclosure.

Another exemplary embodiment of a gas spring and gas damper assembly 300 is shown in FIG. 4 that includes a first or upper end member 302 and a second or lower end member 304 disposed in longitudinally-spaced relation to the first end member. Assembly 300 also includes a longitudinally-extending axis AX that extends generally between first and second end members 302 and 304. Second end member 304 includes a side wall 306 and an end wall 308 that at least partially define an end member cavity 310 within the second end member.

Assembly 300 also includes a flexible wall 312 that is disposed circumferentially about axis AX and extends longitudinally between a first or upper end 314 and a second or lower end 316. First end 314 of flexible wall 312 is operatively connected along first end member 302, and second end 316 of the flexible wall is secured along second end member 304 such that a spring chamber 318 is at least partially defined between the first and second end members.

It will be appreciated that first end member 302 and second end member 304 can be of any suitable type, kind, configuration, arrangement and/or construction. In the exemplary arrangement shown in FIG. 4, first end member 302 includes an outer peripheral wall 320 along which first end 314 of flexible wall 312 is secured in a substantially fluid-tight manner, such as by using a conventional retaining ring 322, for example. First end member 302 is also shown as including a passage 324 that extends through the first end member and is suitable for fluidically interconnecting spring chamber 318 with an external atmosphere (e.g., such as by way of a vent or exhaust) or a pressurized gas system (e.g., an air compressor, a compressed air reservoir, a valve assembly or other device), such as by way of a gas transfer line 326.

Second end member 304, which is sometimes referred to in the art as a piston, is shown in FIG. 4 as including side wall 306 that extends longitudinally away from first end member 302 from along end wall 308. An outer surface 328 of side wall 306 is shown in FIG. 4 as being substantially cylindrical. However, it will be appreciated that the outer surface or outer profile of the second end member can be of any suitable size, shape and/or configuration, such as cylindrical, frustoconical, curvilinear or any combination thereof. Second end 316 of flexible wall 312 is disposed along outer surface 328 of side wall 306 and is secured thereto in a substantially fluid-tight manner, such as by using a retaining ring 330, for example. Side wall 306 also includes an inner surface 332 that at least partially defines end member cavity 310. In one preferred arrangement, inner surface 332 will be substantially cylindrical along the longitudinal length thereof.

It will be appreciated that flexible wall 312 can be of any suitable kind, type, configuration, arrangement and/or construction. In the exemplary embodiment shown, flexible wall 312 is an elongated flexible sleeve or bellows of a suitable construction. However, a convoluted bellows-type flexible wall having one or more convolutions could alternately be used. Flexible wall 312 is shown in the present exemplary embodiment as being of a rolling lobe-type construction in which a rolling lobe 334 rolls or is otherwise displaced along outer surface 328 of side wall 306 as the first and second end members are longitudinally displaced relative to one another.

Gas spring and gas damper assembly 300 is also shown in FIG. 4 as including a damper piston 336 that is received within end member cavity 310 for longitudinal displacement along inner surface 332 of side wall 306. As such, end member cavity 310 is separated into a first portion 310A and a second portion 310B on opposing sides of damper piston 336. A damper rod 338 operatively connects damper piston 336 to first end member 302 such that displacement of the first and second end members relative to one another will generate or otherwise result in movement of damper piston 336 within end member cavity 310. Such movement of damper piston 336 can operate to dissipate kinetic energy acting on gas spring and gas damper assembly 300 and, thus, damp vibrations and other inputs, as is understood of those of skill in the art. It will be appreciated that the interconnection between damper rod 338 and first end member 302 can be made in any suitable manner and by way of any suitable connection and/or arrangement, as discussed above with regard to FIG. 1.

In the exemplary arrangement shown in FIG. 4, assembly 300 acts to damp kinetic energy by allowing gas to flow between spring chamber 318 and first portion 310A of end member cavity 310, as damper piston 336 is displaced along inner surface 332 of sidewall 306. It will be appreciated that such a flow of gas can be affected in any suitable manner, such as by providing one or more passages 340 extending through end wall 308 of second end member 304, for example. It will be appreciated, however, that any other suitable arrangement could alternately be used. Additionally, it will be appreciated that one or more optional components and/or elements, which are represented by dashed box 342, could be fluidically interconnected on or along passage 340 in any suitable manner, such as throttle elements, valves and/or porous filter elements, for example.

During use, a gas spring and gas damper assembly, in accordance with the subject matter of the present disclosure, such as assembly 300, for example, will operate to dissipate kinetic energy acting on the assembly by causing gas flow between spring chamber 318 and end member cavity 310. As first and second end members 302 and 304 are displaced toward one another, the volume of spring chamber 318 will decrease and the volume of first portion 310A of end member cavity 310 will increase, the latter being due to the movement of damper piston 336 away from end wall 308 of second end member 304. As discussed above, increased damping performance can be achieved through the use increased internal differential pressures within a gas damper. One desirable benefit of first portion 310A of the end member cavity increasing in volume as spring chamber 318 decreases in volume is that the differential pressure between that of the spring chamber, as indicated by reference character P3, and the end member cavity pressure, indicated by reference character P4, is not expected to be significantly reduced.

In the exemplary embodiment in FIG. 4, an end wall 344 is secured across the open end (not numbered) of second end member 304, generally opposite end wall 308. This results in second portion 310B of end member cavity 310 being a substantially captured or enclosed volume, which would act against damper piston 336 during displacement of the same away from end wall 308. To minimize or at least reduce any such counter-acting forces, it is desirable permit or otherwise allow gas to flow between first portion 310A and second portion 310B of end member cavity 310 as the damper piston is displaced along side wall 332.

It will be appreciated that such a flow of gas can be provided in any suitable manner, such as by providing a gap between the outer peripheral edge of the damper piston and the inner surface of the side wall and by allowing gas to flow through the gap as the damper piston is displaced. Alternately, as shown in FIG. 4, damper piston 336 can include a suitable sealing member 346 for forming a substantially fluid-tight seal between the damper piston and the inner surface of the side wall. In such case, one or more fluid passages 348 can be provided through damper piston 336 in any suitable manner. Additionally, a throttle element, valve or other device can optionally be fluidically interconnected along passage 348, such as is generally represented by reference number 350 in FIG. 4.

Figure 5:
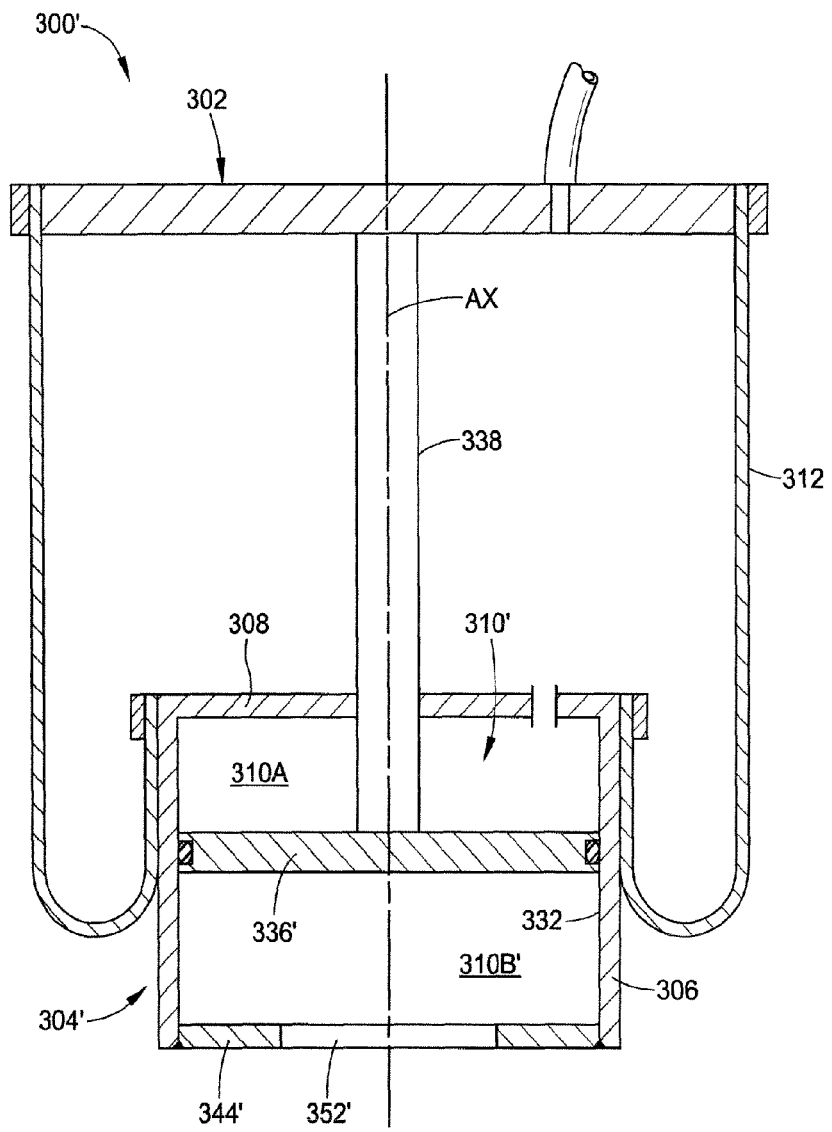
FIG. 5 is a schematic representation of a further example of a gas spring and gas damper assembly in accordance with the subject matter of the present disclosure.

An alternate embodiment of gas spring and gas damper assembly 300 is shown in FIG. 5 as assembly 300'. It will be appreciated that assemblies 300 and 300' are similar and, as such, like reference numbers are used to describe common features and components. New or different features or components are shown and described in FIG. 5 using primed (') reference numbers.

Gas spring and gas damper assembly 300' differs from assembly 300 in that second end member 304' includes an end wall 344' that has an opening or passage 352' extending therethrough. As such, second portion 310B' of end member cavity 310' is open to external atmospheric pressure. In such case, gas within the second portion of the end member cavity does not significantly act against damper piston 336' during movement thereof along inner surface 332 of side wall 306. As such, passage 346 which is shown in FIG. 4 extending through damper piston 336 in assembly 300 can be omitted in the arrangement shown in FIG. 5.

Figure 6:
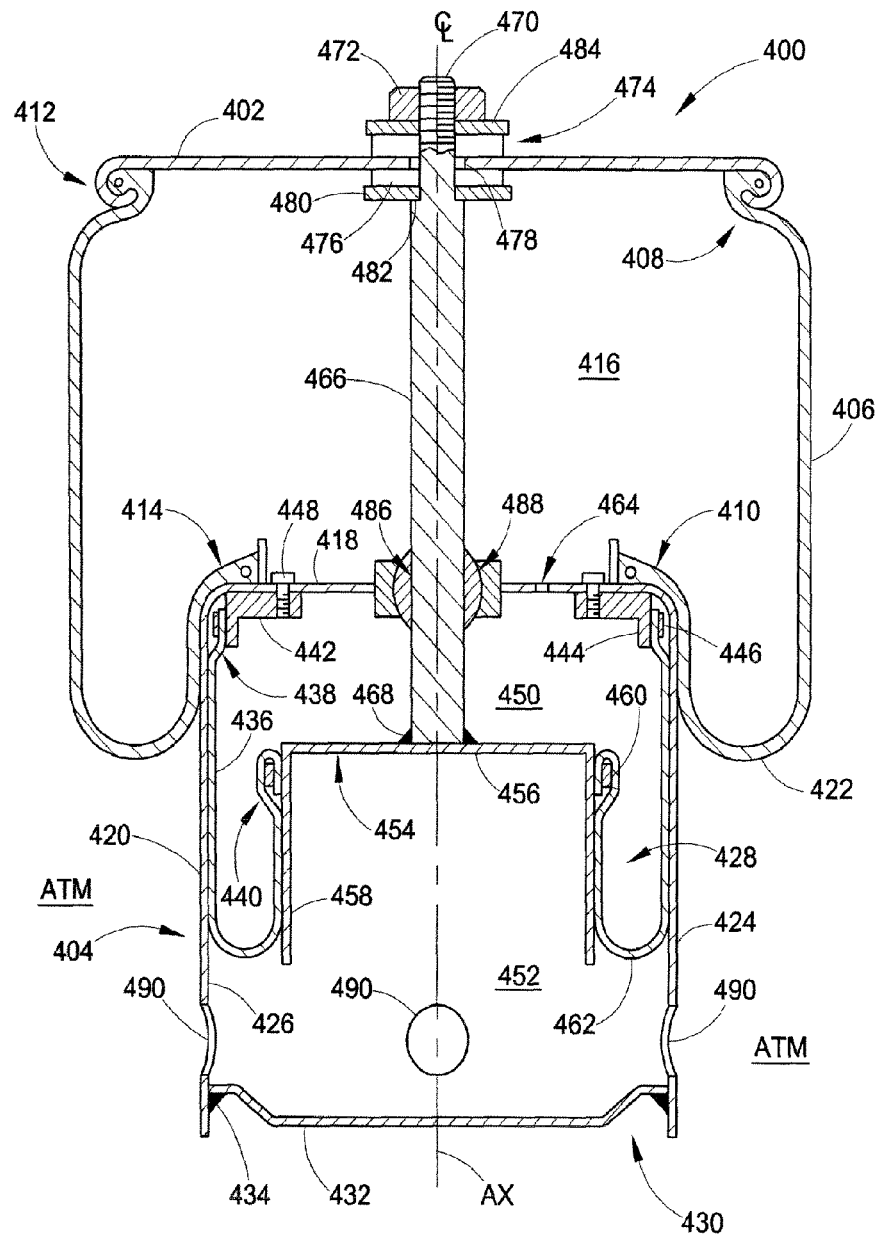
FIG. 6 is a schematic representation of still another example of a gas spring and gas damper assembly in accordance with the subject matter of the present disclosure.

Yet another example of an embodiment of a gas spring and gas damper assembly 400 in accordance with the subject matter of the present disclosure is shown in FIG. 6. Gas spring and gas damper assembly 400 includes a first end member, such as a bead plate 402, for example, and an opposing second end member, such as a first piston 404, for example, that is spaced longitudinally from the first end member such that an axis AX extends longitudinally therebetween. A first flexible wall 406 is disposed circumferentially about axis AX and extends longitudinally between opposing first and second ends 408 and 410. The opposing first and second ends can be respectively secured to the first and second end members in any manner suitable for forming a substantially fluid-tight seal between the flexible wall and the end member, such as by using a crimped connection 412 or a press-fit connection 414, for example. A spring chamber 416 is at least partially defined by first flexible wall 406 between bead plate 402 and first piston 404.

First piston 404 includes an end wall 418 that extends approximately transverse (e.g., perpendicular) to axis AX and a side wall 420 that extends generally longitudinally from the end wall. In the exemplary embodiment shown in FIG. 6, side wall 420 is approximately cylindrical. However, it will be appreciated that any other suitable shape and/or configuration could alternately be used, such as cylindrical, frustoconical, curvilinear or any combination thereof, for example. First flexible wall 406 forms a rolling-lobe 422 along an outer surface 424 of side wall 420 and is displaced therealong in a conventional manner as assembly 400 is extended and compressed during use. End wall 418 and an inner surface 426 of side wall 420 at least partially define a piston cavity 428 having an open end 430. A cover wall 432 extends across open end 430 to further define piston cavity 428. Cover wall 432 can be secured on or along the side wall in any manner suitable for withstanding the anticipated loads borne by assembly 400, such as by using a flowed-material joint 434, for example.

Gas spring and gas damper assembly 400 also includes a second flexible wall 436 that is disposed at least partially within piston cavity 428. In the exemplary arrangement shown in FIG. 6, second flexible wall 436 is disposed circumferentially around axis AX and extends between opposing first and second ends 438 and 440. First end 438 of second flexible wall 436 is shown as being secured on first piston 404 and can be attached thereto in any suitable manner. For example, a mounting plate 442 can be secured on end wall 418 within piston cavity 428. The mounting plate can include an outer peripheral wall 444 to which first end 438 is secured, such as by using a crimp ring 446, for example. Mounting plate 442 can be secured on or along first piston 404 in any suitable manner, such as by attaching the mounting plate to end wall 418 using fasteners 448, for example.

In gas spring and gas damper assembly 400, second flexible wall 436 preferably extends or is otherwise connected across piston cavity 428 such that the piston cavity is separated into first and second chambers 450 and 452 that are substantially fluidically-isolated from one another. Such an arrangement can be provided in any suitable manner. For example, a third end member, such as a second or damper piston 454, for example, can be disposed within piston cavity 428. In the exemplary arrangement shown, second piston 454 includes a second end wall 456 disposed approximately transverse (e.g., perpendicular) to axis AX and a second side wall 458 that extends generally longitudinally from the second end wall. Second end 440 of second flexible wall 436 can be secured on or along second piston 454 in any suitable manner, such as along second side wall 458 using a crimp ring 460, for example. In the exemplary arrangement shown, second flexible wall 436 can form a rolling lobe 462 between side wall 420 of first piston 404 and second side wall 458 of second piston 454. In such case, rolling lobe 462 will roll or be otherwise displaced along side walls 420 and 458 as the second piston moves relative to the first piston, as will be discussed hereinafter.

In one preferred arrangement, spring chamber 416 and first chamber 450 of piston cavity 428 are in fluid communication with one another such that pressurized gas within the gas spring and gas damper assembly can flow between the spring chamber and the first chamber during dynamic operation and use of assembly 400, as will be discussed in greater detail hereinafter. It will be appreciated, however, that the spring chamber and the first chamber can be placed into fluid communication with one another in any suitable manner. In the exemplary embodiment shown in FIG. 6, piston 404 includes a passage 464 extending through end wall 418 through which pressurized gas can flow to pass between the spring chamber and the first chamber. As discussed previously with regard to other embodiments, it will be appreciated that any suitable number of one or more passages can be used and that any such quantity of one or more passages can be of any suitable size, shape, configuration, arrangement or combination thereof. Additionally, throttle elements, valves or other fluid flow-related devices can optionally be fluidically interconnected on or along any such one or more passage or otherwise fluidically interconnect the spring chamber and the first chamber.

In the exemplary arrangement shown in FIG. 6, second piston 454 is interconnected with the first end member (e.g., bead plate 402) by way of a damper or connector rod 466. The second piston can be secured to connector rod 466 in any suitable manner, such as by using a threaded connection or a flowed-material joint 468, for example. Additionally, connector rod 466 can be secured to bead plate 402 in any suitable manner, such as by using a plurality of threads 470 formed along connector rod 466 and a threaded nut 472 that interengages the same, for example. A vibration isolating element 474 can optionally be interconnected between the connector rod and the bead plate. In the exemplary embodiment shown, vibration isolating element 474 includes an elastomeric body 476 that is received within an opening 478 formed through bead plate 402. A first, comparatively-rigid washer 480 engages a shoulder 482 formed on the connecting rod. A second, comparatively-rigid washer 484 is disposed along the elastomeric body opposite the first washer and abuttingly engages threaded nut 472, which captures connector rod 466 on bead plate 402.

During use, the first and second end members (e.g., bead plate 402 and first piston 404) move longitudinally relative to one another and it will be recognized that the first end member and connector rod are axially interconnected with one another in a substantially rigid manner. To accommodate such relative longitudinal movement, the second end member preferably permits the connector rod to pass into an out of the piston cavity formed thereby (e.g., piston cavity 428) in a suitable manner, such as by way of a sliding joint 486 formed along end wall 418 of first piston 404, for example. Additionally, it will be appreciated that the movement of the first and second end members relative to one another may not be purely axial. Rather, the second end member may move along an arcuate or other path as the first and second members are displaced toward and away from one another. In some cases, vibration isolating element 474 may be capable of accommodating such movement paths. However, first piston 404 can optionally include a spherical bearing 488 or other element suitable for permitting relative pivotal movement or rotation between the first piston and the connector rod.

As mentioned above, gas spring and gas damper assembly 400 is extended and collapsed in the generally longitudinal direction during normal operation and use. As the first and second end members (e.g., bead plate 402 and first piston 404) of the assembly are displaced toward one another, the spring chamber (e.g., spring chamber 416) is decreased in volume, which results in a dynamic pressure increase of the gas contained therein. This same movement of the first and second end members toward one another, however, also causes the first chamber (e.g., first chamber 450) of the piston cavity (e.g., cavity 428) to increase in volume, which results in a dynamic pressure reduction of the gas contained therein. The differential pressure between the spring chamber and the first chamber causes, at least in part, the flow of gas from the spring chamber into the first chamber of the piston cavity, such as through the one or more passages fluidically interconnecting the same. As discussed above, this fluid flow can be used to dissipate kinetic energy acting on gas spring and gas damper assembly 400.

In a similar, but opposite manner, as the first and second end members of assembly 400 are displaced away from one another, the spring chamber is increased in volume, which results in a dynamic pressure decrease of the gas contained therein. This same movement of the first and second end members away from one another also causes the first chamber of the piston cavity to decrease in volume, which results in a dynamic pressure increase of the gas contained therein. Again, this differential pressure between the spring chamber and the first chamber results in the flow of gas from the first chamber of the piston cavity into the spring chamber, and can be used to convert kinetic energy into heat, as discussed above.

In the exemplary embodiment shown, the increase in volume of the first chamber (e.g., first chamber 450) is due to the displacement of connector rod 466 into the piston cavity 428, which displaces second piston 454 toward cover wall 432 and thereby increases the volume of first chamber 450 and decreases the volume of second chamber 452 of the piston cavity. To reduce resistance to movement of second piston 454 within piston cavity 428, one or more vent holes 490 can be provided through cover wall 432 and/or side wall 420 to permit fluid communication between second chamber 452 and an external atmosphere ATM.

Figure 7:
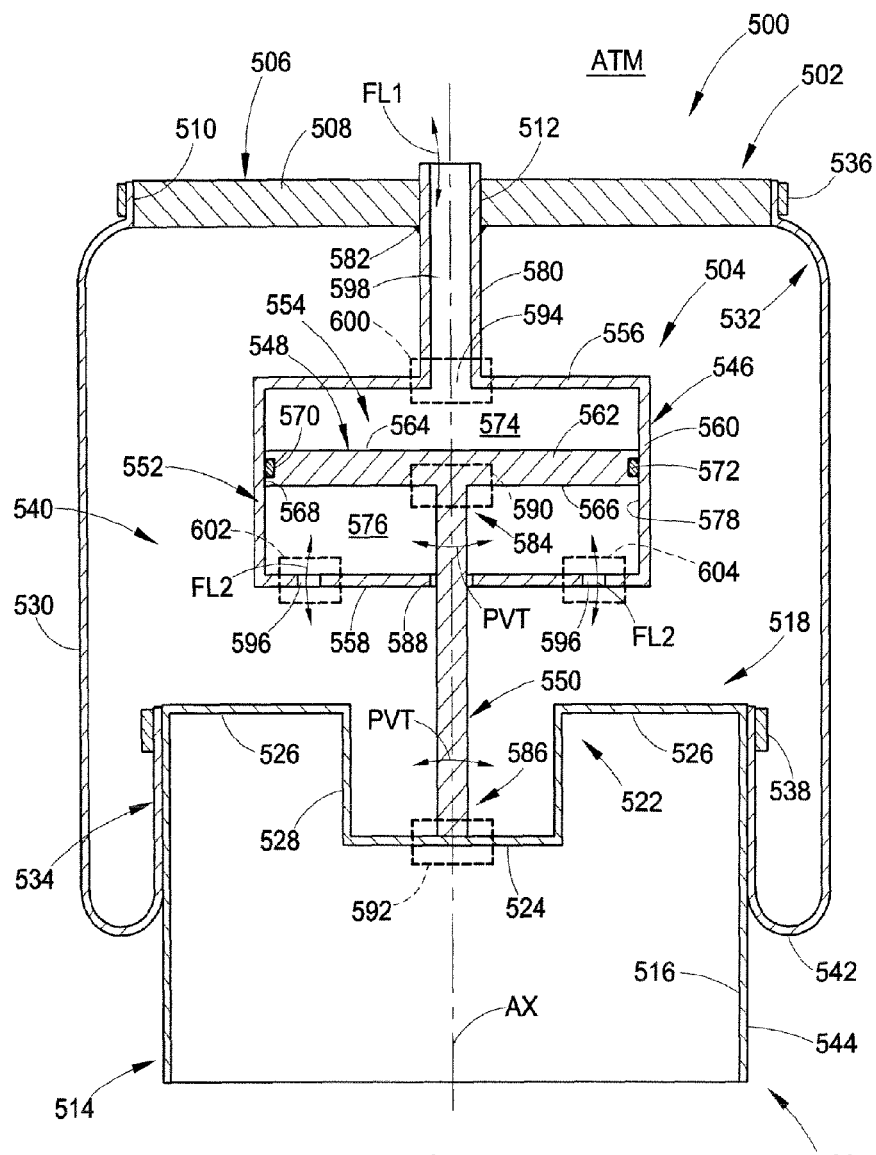
FIG. 7 is a schematic representation of yet another example of a gas spring and gas damper assembly in accordance with the subject matter of the present disclosure.

Still another example of an embodiment of a gas spring and gas damper assembly 500 in accordance with the subject matter of the present disclosure is shown in FIG. 7. Gas spring and gas damper assembly 500 includes a gas spring, which is generally identified by item number 502, and a gas damper, which is generally identified by item number 504. In the exemplary arrangement shown, gas damper 504 is at least partially received within or otherwise encapsulated by gas spring 502. It will be appreciated, however, that other configurations and/or arrangements could alternately be used.

In the exemplary embodiment shown, gas spring 502 includes a first or upper end member 506, such as a bead plate or top cap, for example, that includes an end member wall 508, an outer peripheral wall portion 510 and a passage wall 512 that at least partially defines a passage (not numbered) extending through end member wall 508. Gas spring 502 also includes a second or lower end member 514, such as a bead plate or piston, for example, that is disposed in spaced relation to first end member 506 such that an axis AX extends longitudinally therebetween. In the exemplary arrangement shown in FIG. 7, second end member 514 is shown as being a piston. As such, it will be appreciated that gas spring 502 is of a rolling lobe-type construction. It should be understood, however, that the subject matter of the present disclosure is equally applicable for use in association with gas springs of other types, kinds, constructions and/or arrangements, such as convoluted bellows-type designs, for example.

Second end member 514 is shown as including a side wall 516 that extends generally longitudinally between a first end 518 and an opposing second end 520 of the second end member. An end wall 522 extends approximately transverse (e.g., perpendicular) to axis AX across side wall 516 along first end 518 to form a substantially closed end of the second end member. In the exemplary arrangement shown in FIG. 7, side wall 516 at least partially defines an open end along second end 520. Additionally, side wall 516 is shown as being approximately cylindrical in shape. It will be appreciated, however, that any other arrangement, configuration and/or construction could alternately be used, such as cylindrical, frustoconical, curvilinear or any combination thereof, for example.

End wall 522 is shown as including a first or inner wall portion 524 and a second or outer wall portion 526 that is disposed radially outwardly from the inner wall portion. Additionally, inner wall portion 524 is disposed axially outwardly from (i.e., in longitudinally-spaced relation to) outer wall portion 526 such that an inner side wall portion 528 extends longitudinally between the inner and outer wall portions.

Gas spring 502 also includes a flexible wall 530, which is shown in FIG. 7 as being an elongated sleeve-type flexible wall that extends between a first or upper end 532 and a second or lower end 534. In the exemplary arrangement shown, first end 532 of flexible wall 530 is received along outer peripheral wall portion 510 of first end member 506 and secured thereon using a suitable retaining member, such as a crimp ring 536, for example, such that a substantially fluid-tight seal is formed therebetween. Second end 534 of the flexible wall is received along second end member 514, such as along side wall 516 adjacent first end 518, for example, and is secured thereon using a suitable retaining member, such as a crimp ring 538, for example, such that a substantially fluid-tight seal is formed therebetween. Flexible wall 530 is disposed circumferentially about axis AX and at least partially defines a spring chamber 540 between the first and second end members. Additionally, flexible wall 530 forms a rolling lobe 542 along an outer surface 544 of side wall 516 of the second end member and is displaced therealong in a conventional manner as assembly 500 is extended and compressed during use.

Gas damper 504 includes a damper housing 546 and a damper piston 548 disposed within the damper housing. Gas damper 504 can also include a damper rod 550 or other suitable element that is operatively connected to damper piston 548. In the exemplary arrangement shown, damper housing 546 includes a housing wall 552 that at least partially defines a damping chamber 554. Housing wall 552 is shown as including a first or upper wall portion 556, a second or lower wall portion 558 that is disposed in longitudinally-spaced relation to the first wall portion and a side wall portion 560 that extends in a generally longitudinal direction therebetween.

Damper piston 548 includes a piston body 562 with a first side 564 and an opposing second side 566 that is spaced axially from the first side. An outer peripheral side wall 568 extends longitudinally between the first and second sides of the damper piston. An annular groove 570 can optionally be included that extends radially inwardly into the piston body, such as may be suitable for receiving a sealing member 572, for example.

Damper piston 548 is received within damping chamber 554 of damper housing 546 such that the damper piston separates the damping chamber into a first or upper chamber portion 574 and a second or lower chamber portion 576. In the exemplary embodiment shown in FIG. 7, the outer peripheral extent of damper piston 548 is complimentary to an inner surface 578 of side wall portion 560 of housing wall 552 such that the damper piston is capable of reciprocal movement in an axial direction (i.e., longitudinally along at least a portion of side wall portion 560) within the damper housing. Additionally, the complimentary relationship between the outer peripheral extent of damper piston 548 and the inner surface of side wall portion 560 results in the damper piston at least partially fluidically isolating the first and second portions of damping chamber 554 from one another. In the exemplary arrangement shown in FIG. 7, sealing member 572 can operate to form a substantially fluid-tight seal with inner surface 578 of side wall portion 560 such that first and second chamber portions 574 and 576 of damping chamber 554 are substantially fluidically-isolated from one another.

It will be appreciated that gas damper 504 can be operatively connected within the gas spring between the first and second end members thereof in any suitable manner for causing relative movement between the damper piston and the damper housing to thereby dissipate kinetic energy acting on the gas spring and gas damper assembly during dynamic operation and use thereof. For example, the damper housing could be rigidly attached or otherwise operatively connected to one of the first and second end members of the gas spring with the damper piston attached or otherwise operatively connected to the other of the first and second end members.

In the exemplary embodiment shown in FIG. 7, damper housing 546 includes a connector wall 580 that projects longitudinally from upper wall portion 556 an is received within the passage defined by passage wall 512 in first end member 506. Connector wall 580 can be attached or otherwise operatively connected to end member wall 508 in any suitable manner, such as by using a threaded connection or a flowed-material joint 582, for example. In this manner, damper housing 546 could be considered a part of first end member 506. In an alternate arrangement, the damper housing could be integral to or otherwise be a part or portion of the end member.

Additionally, damper rod 550 is shown as being operatively connected between damper piston 548 and second end member 514 such that relative movement between the first and second end members results in relative movement between the damper piston and the damper housing to thereby dissipate kinetic energy acting on the gas spring and gas damper assembly during dynamic operation and use thereof. In the exemplary embodiment shown in FIG. 7, damper rod 550 extends longitudinally between a first end 584 and an opposing second end 586. First end 584 is shown as being operatively connected to damper piston 548, such as along second side 566 thereof, for example. Second end 586 of the damper rod projects outwardly from damper housing 546, such as by way of a rod opening 588 that extends through lower wall portion 558 of the housing wall, for example.

Second end 586 can be operatively connected to damper piston 548 and second end member 514 in any suitable manner. For example, first end 584 of damper rod 550 could be rigidly connected to damper piston 548, such as by using a threaded connection or a flowed-material joint, for example. As another example, second end 586 of the damper rod could be rigidly connected to second end member 514, such as by using a threaded connection or a flowed-material joint, for example. It will be appreciated, however, that the movement of the first and second end members relative to one another often does not act in a purely axial direction. Rather, the first and second end members are often disposed at an angle relative to one another and/or move along an arcuate or other path as the first and second end members are displaced toward and away from one another. As such, a connection capable of permitting pivotal movement or other angular displacement, as is represented by arrows PVT in FIG. 7, could be utilized along the first and/or second ends of damper rod 550. Such connections are schematically represented in FIG. 7 by dashed boxes 590 and 592 along first and second ends 584 and 586, respectively, of damper rod 550. It will be appreciated that any such connection, if provided, can be of any suitable type, kind, arrangement, configuration and/or construction, such as a ball and socket joint, spherical bearing and/or universal joint, for example.

As discussed above, gas spring and gas damper assembly 500 is extended and collapsed in a generally longitudinal direction during normal operation and use thereof. As first and second end member 506 and 514 are displaced toward one another, damper piston 548 is longitudinally displaced toward first wall portion 556 of housing wall 560. Movement of the damper piston in this first or collapsing direction results in first chamber portion 574 decreasing in volume and second chamber portion 576 is increasing in volume. Additionally, as the first and second end members are displaced away from one another, damper piston 548 is longitudinally displaced toward second wall portion 558 of housing wall 560. Movement of the damper piston in this second or extending direction results in first chamber portion 574 increasing in volume and second chamber portion 576 decreasing in volume.

It is desirable for the movement of damper piston 548 to generate differential pressures that result in gas flow into and out of damping chamber 554 to thereby dissipate kinetic energy acting on the gas spring and gas damper assembly. It will be appreciated that such gas flow can be accomplished in any suitable manner and through the use of fluid passages of any suitable size, shape, quantity, configuration and/or arrangement. Additionally, it will be appreciated that additional components, connectors and/or other elements could be fluidically interconnected with damping chamber 554 in any suitable manner. Furthermore, flow control devices and/or elements of any suitable type and/or kind can also, optionally, be included in fluid communication with damping chamber 554, such as throttle elements, valves and/or porous filter elements, for example.

In the exemplary embodiment shown, damper housing 548 includes a plurality of fluid passages extending therethrough that are suitable for transferring gas into and out of damping chamber 554. For example, housing wall 560 is shown in FIG. 7 as including a first or upper fluid passage 594 that extends through upper wall portion 556 and one or more second fluid passages that extend through lower wall portion 568. In the exemplary embodiment shown, a plurality of second fluid passages 596 extend through the lower wall portion.

It will be appreciated that a gas atmosphere ATM will typically exist that is external to gas spring and gas damper assembly 500. In a preferred arrangement, one of first fluid passage 594 and second fluid passage 596 is disposed in fluid communication with the external gas atmosphere and the other of the first and second fluid passages is disposed in fluid communication with the spring chamber of gas spring 502. In the exemplary embodiment shown, connector wall 580 at least partially defines a connector passage 598 that is open to gas atmosphere ATM at one end and is in fluid communication with first chamber portion 574 of damping chamber 554 at the other end through first fluid passage 594. In this way, gas from atmosphere ATM can be transferred into and out of first chamber portion 574, as is represented by arrows FL1, in response to movements of damper piston 548 within damping chamber 554.

Additionally, in the exemplary embodiment shown in FIG. 7, second chamber portion 576 is in fluid communication with spring chamber 540 through second fluid passages 596. As such, pressurized gas within spring chamber 540 can flow into and out of second chamber portion 576 of damping chamber 554, such as is represented by arrows FL2, for example. As discussed above with regard to other embodiments, such fluid flow can be used to dissipate kinetic energy acting on gas spring and gas damper assembly 500. Furthermore, the characteristics of such fluid flow between spring chamber 540 and second chamber portion 576 of damping chamber 554 can be varied or otherwise controlled in any suitable manner, such as by including one or more flow control devices and/or elements in fluid communication with either or both of the first and second fluid passages. Such flow control devices are schematically represented in FIG. 7 by dashed boxes 600, 602 and 604. It will be appreciated that such flow control devices can be substantially similar to one another, or different from one another such that different fluid flow characteristics can be achieved in different areas and/or directions of fluid flow, such as has been discussed above with regard to other embodiments, for example.

As used herein with reference to certain elements, components and/or structures (e.g., "first end" and "second end"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring and gas damper assembly comprising:
   a first end member;
   a second end member disposed in longitudinally-spaced relation to said first end member such that a longitudinal axis is at least partially defined therebetween, said second end member including an end wall and a side wall extending longitudinally from along said end wall in a direction away from said first end member, said side wall having an inner surface and an outer surface, and said end wall and said side wall together at least partially defining an end member cavity that is at least partially exposed to an ambient external atmosphere;
   a third end member disposed within said end member cavity of said second end member, said third end member including an end wall and a side wall extending longitudinally from along said end wall in a direction away from said first end member, said side wall of said third end member having an outer surface;
   a mounting plate including an outer peripheral wall, said mounting plate disposed within said second end member cavity between said end wall of said second end member and said third end member with at least a portion of said outer peripheral wall spaced radially inward from said side wall of said second end member;
   an elongated rod extending through said end wall of said second end member and said mounting plate, said elongated rod secured between said first and third end members and operative to maintain said third end member in a substantially fixed axial position relative to said first end member;
   a first flexible wall extending peripherally about said axis and longitudinally between first and second ends, said first end of said first flexible wall secured to said first end member such that a substantially fluid-tight seal is formed therebetween, said second end of said first flexible wall secured to said second end member such that a substantially fluid-tight seal is formed therebetween, said first flexible wall at least partially defining a first pressurized gas chamber between said first and second end members, and said first flexible wall forming a first rolling lobe along said outer surface of said side wall of said second end member; and,
   a second flexible wall extending peripherally about said axis and longitudinally between first and second ends, said first end of said second flexible wall secured along said outer peripheral wall of said mounting plate such that said first end of said second flexible wall is attached to said second end member with a substantially fluid-tight seal formed therebetween, and said second end of said second flexible wall secured to said third end member such that a substantially fluid-tight seal is formed therebetween, said second flexible wall at least partially defining a second pressurized gas chamber between said second and third end member, and said second flexible wall forming a second rolling lobe between said inner surface of said side wall of said second end member and said outer surface of said side wall of said third end member;
   upon displacement of said first and second end members relative to one another in an axial direction, said first rolling lobe being displaceable along said outer surface of said side wall of said second end member and said second rolling lobe being displaceable along said inner surface of said side wall of said second end member and along said outer surface of said side wall of said third end member.

2. A gas spring and gas damper assembly according to claim 1, wherein said first and second pressurized gas chambers are disposed in fluid communication with one another such that pressurized gas can be transferred between said first and second pressurized gas chambers during displacement of said first and second end members relative to one another.

3. A gas spring and gas damper assembly according to claim 2, wherein said end wall of said second end member includes at least one gas transfer passage extending therethrough in fluid communication with said first and second pressurized gas chambers.

4. A gas spring and gas damper assembly according to claim 3, wherein said second end member includes one of a throttle element, a valve and a porous metal filter disposed in fluid communication along said at least one gas transfer passage.

5. A gas spring and gas damper assembly according to claim 1, wherein said second flexible wall separates said end member cavity of said second end member into said second pressurized gas chamber and an external cavity portion exposed to the ambient external atmosphere.

6. A gas spring and gas damper assembly according to claim 1, wherein said elongated rod extends through said end wall of said second end member and is slidingly engaged with said end wall such that said elongated rod is capable of reciprocal movement relative to said end wall of said second end member during displacement of said first and second end members relative to one another.

7. A gas spring and gas damper assembly comprising:
a first end member;
a second end member disposed in longitudinally-spaced relation to said first end member such that a longitudinal axis is at least partially defined therebetween, said second end member including an end wall and a side wall extending longitudinally from along said end wall in a direction away from said first end member, said end wall including at least one gas transfer passage extending therethrough, said side wall having an inner surface and an outer surface, and said end wall and said side wall together at least partially defining an end member cavity;
a third end member disposed within said end member cavity of said second end member, said third end member including an end wall and a side wall extending longitudinally from along said end wall in a direction away from said first end member, said side wall of said third end member having an outer surface;
a mounting plate including an outer peripheral wall and being disposed within said second end member cavity, said mounting plate secured along said end wall of said second end member such that said mounting plate is positioned axially between said end wall of said second end member and said third end member with at least a portion of said outer peripheral wall extending axially away from said end wall in radially inwardly-spaced relation to said side wall of said second end member;
an elongated rod secured between said first and third end members and operative to maintain said third end member in a substantially fixed axial position relative to said first end member;
a first flexible wall extending peripherally about said axis and longitudinally between first and second ends, said first end of said first flexible wall secured to said first end member such that a substantially fluid-tight seal is formed therebetween, said second end of said first flexible wall secured to said second end member such that a substantially fluid-tight seal is formed therebetween, said first flexible wall at least partially defining a first pressurized gas chamber between said first and second end members, and said first flexible wall forming a first rolling lobe along said outer surface of said side wall of said second end member;
a second flexible wall extending peripherally about said axis and longitudinally between first and second ends, said first end of said second flexible wall disposed along said outer peripheral wall of said mounting plate, and said second end of said second flexible wall secured to said third end member such that a substantially fluid-tight seal is formed therebetween, said second flexible wall at least partially defining a second pressurized gas chamber between said second and third end members, and said second flexible wall forming a second rolling lobe between said inner surface of said side wall of said second end member and said outer surface of said side wall of said third end member; and,
a retaining ring extending peripherally around said first end of said second flexible wall and axially along said outer peripheral wall of said mounting plate such that said first end of said second flexible wall is secured along said outer peripheral wall of said mounting plate with a substantially fluid-tight seal formed therebetween;
said second pressurized gas chamber in fluid communication with said first pressurized gas chamber through said at least one gas transfer passage in said end wall of said second end member such that upon displacement of said first and second end members relative to one another in an axial direction, said first rolling lobe being displaceable along said outer surface of said side wall of said second end member and said second rolling lobe being displaceable along said inner surface of said side wall of said second end member and along said outer surface of said side wall of said third end member and such that pressurized gas transfer is generated between said first and second pressurized gas chambers to thereby dissipate kinetic energy acting on said gas spring and gas damper assembly.

8. A gas spring and gas damper assembly according to claim 7 further comprising at least one of a throttle element, a valve and a porous metal filter disposed in fluid communication along said at least one gas transfer passage extending through said end wall of said second end member.

9. A gas spring and gas damper assembly according to claim 7, wherein said elongated rod is pivotally attached to at least one of said first end member and said third end member.

10. A gas spring and gas damper assembly according to claim 7, wherein said elongated rod is fixedly attached to at least one of said first end member and said third end member.

11. A gas spring and gas damper assembly according to claim 7, wherein said elongated rod extends through said end wall of said second end member and is slidingly engaged with said end wall of said second end member such that said elongated rod is capable of reciprocal movement relative to said end wall of said second end member during displacement of said first and second end members relative to one another.

12. A gas spring and gas damper assembly according to claim 11, wherein said second end member includes a pivot joint and said elongated rod operatively engages said second end member at said pivot joint such that said second end member can pivot with respect to said elongated rod.

13. A gas spring and gas damper assembly according to claim 7, wherein said second flexible wall separates said end member cavity of said second end member into said second pressurized gas chamber and an external cavity portion exposed to an ambient external atmosphere.

14. A gas spring and gas damper assembly according to claim 13, wherein said second end member includes a cover wall secured across said side wall of said second end member in spaced relation to said end wall of said second end member such that said end member cavity is at least partially defined by said side wall between said end wall and said cover wall.

15. A method of assembling a gas spring and gas damper assembly, said method comprising:
a) providing a first end member;
b) providing a second end member and positioning said second end member in longitudinally-spaced relation to said first end member such that a longitudinal axis is at least partially defined therebetween, said second end member including an end wall and a side wall extending longitudinally from along said end wall in a direction away from said first end member, said side wall having an inner surface and an outer surface, and said end wall and said side wall together at least partially defining an end member cavity;

c) providing a third end member and positioning said third end member within said end member cavity of said second end member, said third end member including an end wall and a side wall extending longitudinally from along said end wall in a direction away from said first end member, said side wall of said third end member having an outer surface;

d) providing a mounting plate that includes an outer peripheral wall;

e) positioning said mounting plate within said end member cavity, and securing said mounting plate adjacent said end wall of said second end member such that at least a portion of said outer peripheral wall extends axially away from said end wall in radially spaced relation to said side wall of said second end member;

f) providing an elongated rod and securing said elongated rod between said first and third end members and operative to maintain said third end member in a substantially fixed axial position relative to said first end member;

g) providing a first flexible wall extending peripherally about a longitudinal axis and longitudinally between first and second ends;

h) securing said first end of said first flexible wall to said first end member such that a substantially fluid-tight seal is formed therebetween and securing said second end of said first flexible wall to said second end member such that a substantially fluid-tight seal is formed therebetween such that said first flexible wall at least partially defines a first pressurized gas chamber between said first and second end members and such that said first flexible wall forms a first rolling lobe along said outer surface of said side wall of said second end member;

i) providing a second flexible wall extending peripherally about a longitudinal axis and longitudinally between first and second ends;

j) securing said first end of said second flexible wall to said outer peripheral wall of said mounting plate such that a substantially fluid-tight seal is formed therebetween and securing said second end of said second flexible wall secured to said third end member such that a substantially fluid-tight seal is formed therebetween such that said second flexible wall at least partially defines a second pressurized gas chamber between said second and third end members and such that said second flexible wall forms a second rolling lobe between said inner surface of said side wall of said second end member and said outer surface of said side wall of said third end member;

k) providing at least one gas transfer passage between said first and second pressurized gas chambers such that said first and second pressurized gas chambers are in fluid communication with one another whereby upon displacement of said first and second end members relative to one another in an axial direction, said first rolling lobe can be displaced along said outer surface of said side wall of said second end member, said second rolling lobe can be displaced along said inner surface of said side wall of said second end member and along said outer surface of said side wall of said third end member, and pressurized gas transfer can be generated between said first and second pressurized gas chambers to thereby dissipate kinetic energy acting on said gas spring and gas damper assembly.

16. A method according to claim 15, wherein providing at least one gas transfer passage in k) includes connecting at least one of a throttle element, a valve and a porous metal filter in fluid communication along said at least one gas transfer passage extending through said end wall of said second end member.

17. A method according to claim 15, wherein securing said first end of said second flexible wall to said outer peripheral wall of said mounting plate and securing said second end of said second flexible wall secured to said third end member in j) includes separating said end member cavity of said second end member into said second pressurized gas chamber and an external cavity portion exposed to an ambient external atmosphere.

18. A method according to claim 15, wherein securing said elongated rod between said first and third end members in f) includes pivotally attaching one end of said elongated rod to one of said first end member and said third end member and fixedly attaching the other end of said elongated rod to the other of said first end member and said third end member.

19. A method according to claim 15, wherein securing said elongated rod between said first and third end members in f) includes extending said elongated rod through said end wall of said second end member and said mounting plate such that said elongated rod is capable of reciprocal movement relative to said end wall of said second end member and said mounting plate during displacement of said first and second end members relative to one another.

20. A method according to claim 19, wherein providing a second end member in b) includes providing a pivot joint along said end wall of said second end member, and securing said elongated rod between said first and third end members in f) includes extending said elongated rod through said pivot joint such that said second end member can pivot relative to said elongated rod.

* * * * *